(12) United States Patent
Sjholm et al.

(10) Patent No.: US 9,446,955 B2
(45) Date of Patent: *Sep. 20, 2016

(54) METHOD FOR PRODUCING A LIGNIN FIBER

(75) Inventors: Elisabeth Sjholm, Marsta (SE); Goran Gellerstedt, Sollentuna (SE); Rickard Drougge, Marsta (SE); Ida Norberg, Sollentuna (SE); Ylva Nordstrom, Danderyd (SE)

(73) Assignee: INNVENTIA AB, Stockholm (SE)

( * ) Notice: Subject to any disclaimer, the term of this patent is extended or adjusted under 35 U.S.C. 154(b) by 361 days.

This patent is subject to a terminal disclaimer.

(21) Appl. No.: 13/985,255

(22) PCT Filed: Feb. 13, 2012

(86) PCT No.: PCT/SE2012/050141
§ 371 (c)(1),
(2), (4) Date: Sep. 30, 2013

(87) PCT Pub. No.: WO2012/112108
PCT Pub. Date: Aug. 23, 2012

(65) Prior Publication Data
US 2014/0219909 A1 Aug. 7, 2014

Related U.S. Application Data

(60) Provisional application No. 61/442,377, filed on Feb. 14, 2011, provisional application No. 61/446,768, filed on Feb. 25, 2011.

(30) Foreign Application Priority Data

Feb. 14, 2011 (SE) ...................................... 1150114
Feb. 25, 2011 (SE) ...................................... 1150179

(51) Int. Cl.
| | |
|---|---|
| C07G 1/00 | (2011.01) |
| D01D 5/08 | (2006.01) |
| D01F 2/00 | (2006.01) |
| D01F 2/24 | (2006.01) |
| C01B 31/00 | (2006.01) |
| D01F 9/00 | (2006.01) |
| D01F 9/17 | (2006.01) |
| C01B 31/02 | (2006.01) |

(52) U.S. Cl.
CPC .............. *C01B 31/00* (2013.01); *C01B 31/02* (2013.01); *C07G 1/00* (2013.01); *D01F 9/00* (2013.01); *D01F 9/17* (2013.01)

(58) Field of Classification Search
CPC .......... C01B 31/02; C07G 1/00; D01D 5/08; D01F 2/00; D01F 2/24; D01F 9/17
USPC ........................ 264/29.2, 29.6, 29.7, 211.11; 423/447.1, 447.7, 447.8; 530/500
See application file for complete search history.

(56) References Cited

U.S. PATENT DOCUMENTS

| | | | |
|---|---|---|---|
| 3,461,082 | A | 8/1969 | Otani et al. |
| 3,723,609 | A | 3/1973 | Mansmann et al. |
| 2008/0317661 | A1 | 12/2008 | Eckert et al. |
| 2008/0318043 | A1 | 12/2008 | Eckert et al. |
| 2013/0183227 | A1 | 7/2013 | Wohlmann et al. |

FOREIGN PATENT DOCUMENTS

| | | |
|---|---|---|
| CN | 101768799 A | 7/2010 |
| GB | 1111299 A | 4/1968 |
| JP | 62110922 A | 5/1987 |
| RU | 2343235 C1 | 1/2009 |
| WO | WO 2012/038259 A1 | 3/2012 |

OTHER PUBLICATIONS

Brodin, et al., 2009; "Kraft lignin as feedstock for chemical products: The effects of membrane filtration"; *Holzforschung;* 62: 290-297.
Brodin, 2009; "Chemical Properties and thermal behavior of Kraft lignins", Licentiate Thesis, Fibre and Polymer Technology, KTH Royal Institute of Technology in 57 pages.
Kadla, J.F. et al., 2002; "Lignin-based carbon fibers for composite fiber applications;" *Carbon;* 40: 2913-2920.
Kubo, S. and Kadla, J.F. 2005; "Lignin-based carbon fibers: Effect of synthetic polymer blending on fiber properties", *Journal of Polymers and the Environment;* 13: 97-105.
Supplemental European Search Report in corresponding European Application No. 12 74 7498, dated Dec. 23, 2014.
Uraki, Y. et al. 1995 "Preparation of carbon fibers from organosolv lignin obtained by aqueous acetic acid pulping" *Holzforschung* 49: 343-350.
Further Examination Report in New Zealand Application No. 613310, dated Aug. 3, 2015.
Kadla, J.F. 2002 in *Chemical Modification, Properties, and Usage of Lignin,* edited by Thomas Q. Hu, Springer Science + Business Media LLC, in particular pp. 121-137 relating to the chapter entitled "Lignin-Based Carbon Fibers."
Decision of Grant (English translation) issued in Russian Patent Application No. 2013141916, on Mar. 23, 2016.
Office Action issued in corresponding Chilean Patent Application No. 2348-13, on May 12, 2016.
De Lopez, Helda A., et al., "Estabilización de Fibras de Brea de Carbón Revista Colombiana de Química," Bogotá (Colombia), vol. 21(1- 2 DE), pp. 33-38 (1992).

*Primary Examiner* — Leo B Tentoni

(74) *Attorney, Agent, or Firm* — Knobbe, Martens, Olson & Bear, LLP

(57) ABSTRACT

Disclosed is a method of producing a continuous lignin fiber from softwood and/or hardwood alkali lignin. The lignin fiber can be further treated to obtain structural carbon fiber.

15 Claims, 1 Drawing Sheet

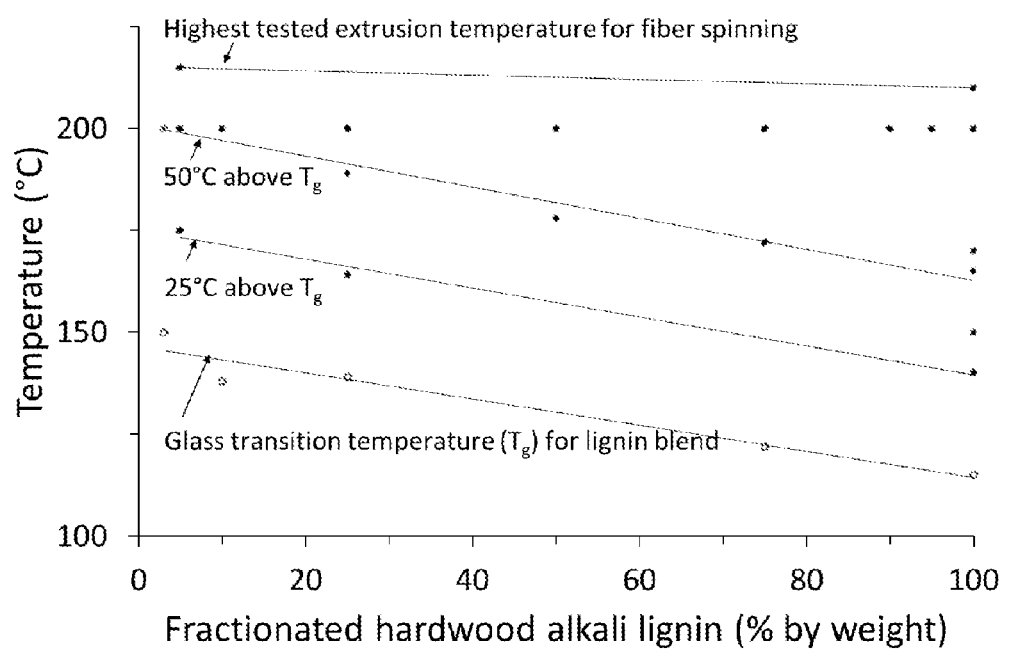

METHOD FOR PRODUCING A LIGNIN FIBER

FIELD OF INVENTION

The present invention relates to methods of producing lignin fibers and structural carbon fibers from softwood and/or hardwood alkali lignin.

BACKGROUND

Carbon fibers are high-strength light-weight materials commonly produced by heat treatment and pyrolysis of polyacrylonitrile, a synthetic material made from petroleum feedstock but other precursors are also used to a minor extent such as petroleum- or coal-based pitch and rayon fibers. There are certain drawbacks in the current precursors such as the high price of polyacrylonitrile and its slow graphitization and the uneven quality of pitch. In addition, the two major commercial precursors used are from non-renewable sources.

Lignin is present in all vascular plants making it second to cellulose in abundance among polymers in nature. In the pulp and paper industry, large quantities of lignin are produced as a byproduct with primary use as the source of internally generated energy in pulp mills. The kraft process is predominant in the world for liberating cellulosic fibers from wood for further processing to paper, board and tissue products. In the process, lignin becomes dissolved in the alkali pulping liquor, denoted black liquor, from where it can be further processed to energy by combustion of the partly evaporated black liquor or, alternatively, isolated in solid form by addition of acid. The isolation of lignin may occur in several steps since a major portion of lignin can precipitate out from the black liquor already at high pH-values as described in the book Lignins (Eds K. V. Sarkanen and C. H. Ludwig, Wiley-Interscience 1971, p 672). Such lignin precipitate will still contain appreciable amounts of sodium and other inorganic species making the lignin unsuitable as precursor for structural carbon fibers (see below).

Alkali lignins are obtained from black liquors obtained from either kraft or soda pulping. Commercially, these pulping processes are applied on softwoods, hardwoods as well as on annual plant biomass. On pulping, some of the wood polymers, notably lignin and hemicelluloses, are to a major extent chemically modified and solubilized in the black liquor.

Among wood species used in alkali pulping processes major gymnosperm species (softwood) include spruce, pine, larch, hemlock and Douglas fir. Major angiosperm species (hardwood) include birch, aspen, poplar, eucalypt species, acacia, and maple.

In the published literature, it has been suggested that lignin might be an alternative precursor of carbon fiber due to its potentially large availability, its expected lower cost, and its high content of carbon (>60%). In addition, lignin is a renewable material. Two types of carbon fibers have been discerned; 1) continuously spun, solid and homogeneous carbon fibers used as strength-giving reinforcement elements in construction materials (herein also referred to as structural carbon fibers) and 2) activated porous carbon fibers with large internal pore structure for adsorption of gases and liquids where the activation can be done chemically with e.g. potassium or sodium hydroxide, zinc chloride or phosphorous acid, or physically with e.g. steam or carbon dioxide, or by applying the latter to chemically pre-activated fibers (Carbon Fiber Application, in the $3^{rd}$ ed. of the book Carbon Fiber, Eds. Donnet, Wang, Rebouillat and Peng, Marcel Dekker 1998, p. 463).

In an early attempt to carbonize lignin fibers using lignin originating from woody material, several types of activated carbon fibers suitable for adsorbing products were produced as described in U.S. Pat. No. 3,461,082. Either thiolignin (kraft lignin), alkali lignin (from soda pulping), or calcium lignosulfonate from hardwood and softwood were used and in the examples, fibers produced using wet spinning, dry spinning and melt spinning, are described. Although dry spinning appears to be the preferred mode of fiber production, in Example 5, a mixture of softwood and hardwood thiolignin (1:1 by weight) was used in argon atmosphere at 170° C. to make lignin fiber by melt spinning. After pre-treatment in air at 150° C. for 10 hours, the fibers were further heated to 900° C. and activated at that temperature during 1 hour by introduction of air. In further examples, other activating agents such as zinc chloride, sodium hydroxide, or potassium hydroxide were tried. However, only short-length fibers could be produced.

To date, all attempts to produce continuous carbon fibers from 100% unfractionated or fractionated softwood lignin have failed. Only discontinuous lignin fiber production has been possible, by the use of low molecular mass fraction lignin, obtained from fractionation of such lignin in organic solvent.

Fibers from extensively purified hardwood kraft lignin, on the other hand, have been made by extrusion of the lignin after admixing with softening agents such as poly-ethylene-terephtalate (PET) or poly-ethyleneoxide (PEO). The resulting lignin fiber has been further converted into carbon fiber through stabilization in air and carbonization.

Since softwood pulping is predominant in the northern hemisphere, there is a need for a method making use of this source of raw material by producing lignin fibers from softwood alkali lignin, for further use as precursor for carbon fiber manufacture.

Moreover, there exists a need for a method of manufacturing lignin fibers, for subsequent use as carbon fiber precursor, from hardwood alkali lignin, without the need for expensive softening agents and elaborate processes for purification of the hardwood alkali lignin.

DESCRIPTION OF THE INVENTION

According to a first aspect of the invention, there is provided a method of producing a continuous lignin fiber comprising the following steps:
  a) providing fractionated and isolated hardwood alkali lignin or fractionated and isolated softwood alkali lignin;
  b) optionally addition of unfractionated softwood alkali lignin and/or unfractionated hardwood alkali lignin (herein below also collectively referred to as "unfractionated lignin", or simply "lignin"), to the fractionated hardwood alkali lignin; or
  c) optionally addition of unfractionated hardwood alkali lignin to the fractionated softwood alkali lignin;
  d) extrusion of the material formed, whereby a continuous lignin fiber is obtained.

The amount of fractionated and isolated hardwood alkali lignin is in one embodiment 100% of the material to be extruded. In another embodiment, the amount of fractionated and isolated softwood alkali lignin is 100% of the material to be extruded.

In accordance with the present invention, unfractionated softwood alkali lignin and/or unfractionated hardwood alkali lignin may be mixed with the fractionated and isolated hardwood alkali lignin. The latter has advantageously been fractionated according to the principle of ultra filtration as described herein. The fractionated hardwood alkali lignin provided may be obtained by fractionation of e.g. hardwood black liquor.

The fractionated and isolated hardwood alkali lignin in one embodiment amounts to 1.5-100% by weight of the material to be extruded. In one embodiment, fractionated and isolated hardwood alkali lignin amounts to from 2, 2.5, 3, 3.5, 4 up to 100% by weight of the material to be extruded. Alternatively, the fractionated and isolated hardwood alkali lignin may amount to 5-100, or 5-95% by weight, of the material to be extruded. In yet an embodiment, the range of addition of fractionated and isolated hardwood alkali lignin is 25-75% by weight of the material to be extruded.

A material constituting fractionated and isolated hardwood alkali lignin, unfractionated softwood alkali lignin and/or unfractionated hardwood alkali lignin, and wherein less than 1.5% of the material constitutes fractionated hardwood alkali lignin will behave as e.g. 100% unfractionated softwood alkali lignin (or 100% unfractionated hardwood alkali lignin) and no continuous fibers can be obtained.

In accordance with the invention, fractionated and isolated softwood alkali lignin may be mixed with unfractionated hardwood alkali lignin. The fractionated and isolated softwood alkali lignin has advantageously been fractionated according to the principle of ultra filtration as described herein. The fractionated softwood alkali lignin provided may be obtained by fractionation of e.g. softwood black liquor.

The fractionated and isolated softwood alkali lignin in one embodiment amounts to 50-100% by weight of the material to be extruded. Alternatively, the fractionated and isolated softwood alkali lignin amounts to 60-90% by weight of the material to be extruded. In yet an alternative, the fractionated and isolated softwood alkali lignin amounts to 75-85% by weight of the material to be extruded.

A material constituting fractionated and isolated softwood alkali lignin, unfractionated hardwood alkali lignin and wherein less than 50% of the material constitutes fractionated and isolated softwood alkali lignin will behave as e.g. 100% unfractionated softwood alkali lignin (or 100% unfractionated hardwood alkali lignin) and no continuous fibers can be obtained.

There are various means of fractionating lignin to obtain fractionated alkali lignin. In one embodiment, ultra filtration is made use of. In another embodiment of the invention, extraction in organic solvent(s) is not made use of to obtain the fractionated alkali lignin.

Fractionation is preferably carried out using ultra filtration of black liquor, inert at the conditions present, i.e. high alkalinity at high temperatures, with a filter that permits a lignin-rich permeate while high molecular weight lignin particles, high molecular weight lignin-carbohydrate complexes, and non-lignin residues are left in the retentate. Ultra filtration was in accordance with the invention performed using a ceramic membrane. One ceramic membrane used had a cut-off value of 15 kDa (Orelis, France). The temperature during ultra filtration may be a temperature in the interval of from 80° C. to 150° C., e.g. 90, 100, 110, 120, 130, 140° C., or any interval therein between. Further permeate treatment involves acidification, filtration of the precipitated alkali lignin, re-dispersion of the lignin in aqueous acidic solution, washing with water, and drying (a preferred mode is described in EP 1794363). Thereby, fractionated alkali lignin is obtained.

Softwood alkali lignin may be isolated from fractionated softwood black liquor by means of precipitation and involving the following steps; addition of acid to black liquor until lignin precipitation occurs, filtration and re-dispersing the lignin cake in aqueous mineral acid, filtration, washing with water, and drying. In a preferred mode of lignin isolation the procedure described in EP 1794363 is applied. The resulting dried lignin has a purity that is sufficient for its further processing into lignin fiber. Thus, the content of non-lignin residues such as ash is below 1% and carbohydrates below 4%. Softwood alkali lignin alone cannot be converted into solid homogeneous lignin fiber, since, the material cannot soften enough to be extruded into continuous fibers.

Analogously to the method described above, hardwood alkali lignin can be isolated from fractionated hardwood black liquor. Direct mixing of this lignin in any proportion with softwood alkali lignin was shown not to provide continuous spinnability through melt extrusion for the formation of solid fibers required for structural carbon fiber applications.

The fractionated hardwood alkali lignin is isolated preferably as described below. Isolation is initiated by acidification of the fractionated hardwood alkali lignin permeate to a pH in the interval of from 2 to 11, e.g. a pH of approximately 9. Acidification may be obtained by the use of carbon dioxide, whereby acidification may be to a pH in the interval of from 5.5 to 11, e.g. from pH 8 to 11. Alternatively, for obtaining low pH values, acidification can be done using any other acid such as sulfuric acid. The precipitated lignin permeate is separated. The separation may be done by filtering. Thereafter, the lignin cake obtained may be suspended in a solvent, e.g. water. The solvent may be acidified to a pH in the interval of from 1 to 6, e.g. a pH of approximately 2. Acidification may be carried out by using any acid such as sulfuric acid. Isolation of fractionated softwood alkali lignin, hardwood alkali lignin and softwood alkali lignin may be performed mutatis mutandis.

A narrow single glass transition with a single glass transition temperature demonstrates that a homogeneous lignin material suitable for extrusion has been obtained. The lignin material is in one embodiment melt extruded at a temperature exceeding the glass transition temperature of the lignin material by 20-85° C., for the formation of a continuous lignin fiber. In one embodiment, said temperature interval is 25-50° C. In another embodiment, melt extrusion is performed at a temperature in the range of 110-250° C., for the formation of a continuous lignin fiber.

The chosen temperature interval for extrusion is dependent on the proportions between unfractionated softwood and/or unfractionated hardwood alkali lignin on one hand and fractionated hardwood alkali lignin on the other.

FIG. 1 shows the relationship between proportions of unfractionated softwood alkali lignin on the one hand and fractionated hardwood alkali lignin on the other. The extrusion temperature should be chosen between $T_g$ (glass transition temperature) and $T_d$ (decomposition temperature). For the lowest possible portion of fractionated hardwood alkali lignin (1.5%), an extrusion temperature of 175-215° C. may advantageously be chosen while for 100% fractionated hardwood alkali lignin the preferred extrusion temperature is in the range of 135-210° C. For other proportions between unfractionated and fractionated lignins, intermediate temperatures according to the FIGURE may be chosen.

All lignin ratios in accordance with the invention, containing at least 1.5% fractionated hardwood alkali lignin, resulted in continuous lignin fibers that were found to be solid and homogeneous without cracks and pores as revealed by analysis with scanning electron microscopy (SEM). Lignin fibers from 100% fractionated softwood alkali lignin were also found to be solid and homogeneous without cracks and pores as revealed by analysis with scanning electron microscopy (SEM).

Fiber diameters were in the range of 25-125 μm. According to the invention, there is provided a method of producing structural carbon fiber, wherein the lignin fiber produced according to the first aspect undergoes the following subsequent process steps:
 a) Stabilization of the lignin fiber
 b) Carbonization of the stabilized lignin fiber In one embodiment, the lignin fiber produced is stabilized by air or oxygen. Subsequently, carbonization may proceed in inert, e.g. nitrogen, atmosphere. The structural carbon fiber produced was shown by SEM analysis to be completely solid and homogeneous (i.e. structural by definition).

The invention shall now be further described, with reference to the accompanied FIGURE and Examples. The person skilled in the art realizes that various changes of embodiments and examples can be made, without departing from the spirit and scope of the invention.

Definitions used:
$T_g$=Glass transition temperature, defined as the inflection point value.
$T_d$=Decomposition temperature, defined as the temperature at which 95% of the material remains.

SHORT DESCRIPTION OF THE FIGURE

FIG. 1 shows the relationship between amount of added fractionated hardwood alkali lignin and glass transition temperature ($T_g$, (open circles) of a mixture between softwood alkali lignin and fractionated hardwood alkali lignin, as well as for neat fractionated hardwood alkali lignin. In the FIGURE, the preferred temperature range for melt extrusion at various mixture ratios is also shown (i.e. 25 and 50° C. above $T_g$ respectively).

EXAMPLES

In the following, examples on the preparation of kraft lignins from unfractionated black liquors (Example 1-2) and from fractionated black liquors (Example 3-4), respectively, are given.

Furthermore, examples are given on how to use or combine the kraft lignin materials obtained to produce continuous lignin fibers (Examples 5-24 and 26-28). Procedures for oxidatively stabilizing the lignin fibers are described (Examples 30-37), and carbonization procedures for stabilized kraft lignin fibers derived from softwood kraft lignin (Examples 25) and hardwood kraft lignin (Example 29).

1. Isolation of Softwood Kraft Lignin

Softwood kraft lignin was isolated from black liquor obtained through pulping of a mixture of pine and spruce wood with kraft pulping liquor. The lignin isolation procedure was done following the steps described in EP 1794363. The following characteristics were obtained: Ash 0.9%, carbohydrates 2%, glass transition temperature ($T_g$) 140° C., decomposition temperature ($T_d$) 273° C.

2. Isolation of Hardwood Kraft Lignin

Hardwood kraft lignin was isolated from black liquor obtained through pulping of a mixture of birch and aspen wood with kraft pulping liquor. The lignin isolation procedure was done following the steps described in EP 1794363. The following characteristics were obtained: Ash 0.8%, carbohydrates 4%, glass transition temperature ($T_g$) 139° C., decomposition temperature ($T_d$) 274° C.

3. Isolation of Fractionated Hardwood Kraft Lignin

Black liquor, obtained from kraft pulping of a mixture of birch and aspen wood, was subjected to ultra filtration using ceramic membrane (15 kDa) at a temperature of 120° C. The collected permeate was acidified by gaseous carbon dioxide at 60° C. to pH ~9. After filtration, the lignin cake was suspended in water and acidified to pH ~2 with sulfuric acid. Filtration of the lignin followed by washing with water and drying afforded purified hardwood kraft lignin with the following characteristics: ash 0.9%, carbohydrates 0.4%, glass transition temperature ($T_g$) 114° C., decomposition temperature ($T_d$) 274° C.

4. Isolation of Fractionated Softwood Kraft Lignin

Black liquor, obtained from kraft pulping of a mixture of pine and spruce wood, was subjected to ultra filtration using ceramic membrane (15 kDa) at a temperature of 120° C. The collected permeate was acidified by gaseous carbon dioxide at 70° C. to pH ~9. After filtration, the lignin cake was suspended in water and acidified to pH ~2 with sulfuric acid. Filtration of the lignin followed by washing with water and drying afforded purified softwood kraft lignin with the following characteristics: ash 0.9%, carbohydrates 0.4%, glass transition temperature ($T_g$) 140° C., decomposition temperature ($T_d$) 280° C.

5. Preparation of Softwood Lignin Fiber Containing 3% Fractionated Hardwood Lignin at 200° C.

Dry kraft lignin from Example 1 and Example 3 were mixed in the proportions 97:3 by weight (7 grams in total) and introduced in a laboratory extruder kept at 200° C. The two lignins were mixed at that temperature in the extruder by rotating the two screws at a speed of ~25 rpm for at least 10 minutes before extrusion of the lignin fiber through a die of 0.5 mm in diameter. The resulting continuous lignin fiber was collected on a bobbin using a winding speed of 30 m/min.

6. Preparation of Softwood Lignin Fiber Containing 5% Fractionated Hardwood Lignin at 200° C.

A total of 7 grams of dry kraft lignin from Example 1 and Example 3 were mixed in the proportions 95:5 (by weight) and introduced in a laboratory extruder kept at 200° C. Lignin fibers were produced as described in Example 5.

7. Preparation of Softwood Lignin Fiber Containing 5% Fractionated Hardwood Lignin at 175° C.

A total of 7 grams of dry kraft lignin from Example 1 and Example 3 were mixed in the proportions 95:5 (by weight) and introduced in a laboratory extruder kept at 175° C. Lignin fibers were produced as described in Example 5.

8. Preparation of Softwood Lignin Fiber Containing 5% Fractionated Hardwood Lignin at 215° C.

A total of 7 grams of dry kraft lignin from Example 1 and Example 3 were mixed in the proportions 95:5 (by weight) and introduced in a laboratory extruder kept at 215° C. Lignin fibers were produced as described in Example 5.

9. Preparation of Softwood Lignin Fiber Containing 10% Fractionated Hardwood Lignin at 200° C.

A total of 7 grams of dry kraft lignin from Example 1 and Example 3 were mixed in the proportions 9:1 (by weight) and introduced in a laboratory extruder kept at 200° C. Lignin fibers were produced as described in Example 5.

10. Preparation of Softwood Lignin Fiber Containing 25% fractionated hardwood lignin at 200° C.

A total of 7 grams of dry kraft lignin from Example 1 and Example 3 were mixed in the proportions 75:25 (by weight) and introduced in a laboratory extruder kept at 200° C. Lignin fibers were produced as described in Example 5.

11. Preparation of Softwood Lignin Fiber Containing 25% Fractionated Hardwood Lignin at 164° C.

A total of 7 grams of dry kraft lignin from Example 1 and Example 3 were mixed in the proportions 75:25 (by weight) and introduced in a laboratory extruder kept at 164° C. Lignin fibers were produced as described in Example 5.

12. Preparation of Softwood Lignin Fiber Containing 25% Fractionated Hardwood Lignin at 189° C.

A total of 7 grams of dry kraft lignin from Example 1 and Example 3 were mixed in the proportions 75:25 (by weight) and introduced in a laboratory extruder kept at 189° C. Lignin fibers were produced as described in Example 5.

13. Preparation of Softwood Lignin Fiber Containing 50% Fractionated Hardwood Lignin at 200° C.

A total of 7 grams of dry kraft lignin from Example 1 and Example 3 were mixed in the proportions 50:50 (by weight) and introduced in a laboratory extruder kept at 200° C. Lignin fibers were produced as described in Example 5.

14. Preparation of Softwood Lignin Fiber Containing 50% Fractionated Hardwood Lignin at 178° C.

A total of 7 grams of dry kraft lignin from Example 1 and Example 3 were mixed in the proportions 50:50 (by weight) and introduced in a laboratory extruder kept at 178° C. Lignin fibers were produced as described in Example 5.

15. Preparation of Softwood Lignin Fiber Containing 75% Fractionated Hardwood Lignin at 200° C.

A total of 7 grams of dry kraft lignin from Example 1 and Example 3 were mixed in the proportions 25:75 (by weight) and introduced in a laboratory extruder kept at 200° C. Lignin fibers were produced as described in Example 5.

16. Preparation of Softwood Lignin Fiber Containing 75% Fractionated Hardwood Lignin at 172° C.

A total of 7 grams of dry kraft lignin from Example 1 and Example 3 were mixed in the proportions 25:75 (by weight) and introduced in a laboratory extruder kept at 172° C. Lignin fibers were produced as described in Example 5.

17. Preparation of Softwood Lignin Fiber Containing 90% Fractionated Hardwood Lignin at 200° C.

A total of 7 grams of dry kraft lignin from Example 1 and Example 3 were mixed in the proportions 10:90 (by weight) and introduced in a laboratory extruder kept at 200° C. Lignin fibers were produced as described in Example 5.

18. Preparation of Softwood Lignin Fiber Containing 95% Fractionated Hardwood Lignin at 200° C.

A total of 7 grams of dry kraft lignin from Example 1 and Example 3 were mixed in the proportions 5:95 (by weight) and introduced in a laboratory extruder kept at 200° C. Lignin fibers were produced as described in Example 5.

19. Preparation of Lignin Fiber from Fractionated Hardwood Lignin at 140° C.

Dry fractionated hardwood kraft lignin (7 grams) was prepared as described in Example 3 and introduced in a laboratory extruder kept at 140° C. Lignin fibers were produced as described in Example 5.

20. Preparation of Lignin Fiber from Fractionated Hardwood Lignin at 165° C.

Dry fractionated hardwood kraft lignin (7 grams) was prepared as described in Example 3 and introduced in a laboratory extruder kept at 165° C. Lignin fibers were produced as described in Example 5.

21. Preparation of Lignin Fiber from Fractionated Hardwood Lignin at 200° C.

Dry fractionated hardwood kraft lignin (7 grams) was prepared as described in Example 3 and introduced in a laboratory extruder kept at 200° C. Lignin fibers were produced as described in Example 5.

22. Preparation of Lignin Fiber from Fractionated Hardwood Lignin at 210° C.

Dry fractionated hardwood kraft lignin (7 grams) was prepared as described in Example 3 and introduced into a laboratory extruder kept at 210° C. Lignin fibers were produced as described in Example 5.

23. Preparation of Lignin Fiber from Fractionated Softwood Lignin at 200° C.

Dry fractionated softwood kraft lignin (7 grams) was prepared as described in Example 4 and introduced in a laboratory extruder kept at 200° C. Lignin fibers were produced as described in Example 5.

24. Preparation of Lignin Fiber from Fractionated Softwood Lignin Containing 25% Hardwood Lignin at 190° C.

A total of 7 grams of dry kraft lignin from Example 4 and Example 2 were mixed in the proportions 75:25 (by weight) and introduced in a laboratory extruder kept at 190° C. Lignin fibers were produced as described in Example 5.

25. Preparation of Solid and Homogeneous Carbon Fiber Based on Softwood Lignin Fiber and Fractionated Hardwood Lignin.

Lignin fibers from Example 9 were thermally stabilized in air at 250° C. during 60 min using a temperature increase of 0.2° C./min from room temperature. Subsequent heating of the fibers with 1° C./min up to 600° C. then 3° C./min to a final temperature of 1000° C. afforded solid carbon fibers.

26. Preparation of Hardwood Lignin Fiber Containing 5% Fractionated Hardwood Lignin at 170° C.

A total of 7 grams of dry kraft lignin from Example 2 and Example 3 were mixed in the proportions 95:5 (by weight) and introduced in a laboratory extruder kept at 170° C. Lignin fibers were produced as described in Example 5, using a winding speed of the bobbin of 30 m/minute.

27. Preparation of Hardwood Lignin Fiber Containing 20% Fractionated Hardwood Lignin at 200° C.

A total of 7 grams of dry kraft lignin from Example 2 and Example 3 were mixed in the proportions 80:20 (by weight) and introduced in a laboratory extruder kept at 200° C. Lignin fibers were produced as described in Example 5, using a winding speed of the bobbin of 74 m/minute.

28. Preparation of Hardwood Lignin Fiber Containing 40% Fractionated Hardwood Lignin at 200° C.

A total of 7 grams of dry kraft lignin from Example 2 and Example 3 were mixed in the proportions 60:40 (by weight) and introduced in a laboratory extruder kept at 200° C. Lignin fibers were produced as described in Example 5, using a winding speed of the bobbin of 74 m/minute.

29. Preparation of Solid and Homogeneous Carbon Fiber Based on Hardwood Lignin Fiber Lignin fibers from Example 28 were thermally stabilized in air at 250° C. during 60 min using a temperature increase of 0.2° C./min from room temperature. Subsequent heating of the fibers with 1° C./min up to 600° C. then 3° C./min to a final temperature of 1000° C. afforded solid carbon fibers.

30. Stabilization of Softwood Kraft Lignin Fibers

Softwood kraft lignin fibers from Example 23 were stabilized in air in a temperature controlled oven using a heating rate of 15° C./min from ambient to 250° C., where it was isothermally treated for 30 min.

31. Stabilization of Single Softwood Kraft Lignin Fibers at 250° C.

Single softwood kraft lignin fibers from Example 23 were stabilized according to Example 30 using a heating rate of 70° C./min from ambient to 250° C., where it was isothermally treated for 10 min at that temperature.

32. Stabilization of Single Softwood Kraft Lignin Fibers at 220° C.

Single softwood kraft lignin fibers from Example 23 were stabilized according to Example 30 using a heating rate of 40° C./min from ambient to 220° C., where it was isothermally treated for 10 min at that temperature.

33. Stabilization of Single Softwood Kraft Lignin Fibers at 200° C.

Single softwood kraft lignin fibers from Example 23 were stabilized according to Example 30 using a heating rate of 70° C./min from ambient to 200° C., where it was isothermally treated for 30 min.

34. Stabilization of Softwood Kraft Lignin Fiber Containing 10% Fractionated Hardwood Lignin Kraft lignin fibers from Example 9 were stabilized according to Example 30 using a heating rate of 3° C./min from ambient to 250° C., where it was isothermally treated for 30 min.

35. Stabilization of Single Softwood Kraft Lignin Fiber Containing 10% Fractionated Hardwood Lignin Single kraft lignin fibers from Example 9 were stabilized according to Example 30 using a heating rate of 70° C./min to 250° C., where it was isothermally treated for 10 min.

36. Stabilization of Single Softwood Kraft Lignin Fiber Containing 10% Fractionated Hardwood Lignin Single kraft lignin fibers from Example 9 were stabilized according to Example 30 using a heating rate of 70° C./min from ambient to 200° C., where it was isothermally treated for 30 min.

37. Stabilization of Single Softwood Kraft Lignin Fiber Containing 5% Fractionated Hardwood Lignin Softwood kraft lignin fibers from Example 6 were stabilized according to Example 30 using a heating rate of 10° C./min from ambient to 250° C., where it was isothermally treated for 60 min.

The invention claimed is:

1. Method of producing a continuous lignin fiber comprising the following steps,
   a) providing fractionated and isolated hardwood alkali lignin or fractionated and isolated softwood alkali lignin;
   b) adding unfractionated softwood alkali lignin and/or unfractionated hardwood alkali lignin to the fractionated hardwood alkali lignin, or
   c) adding unfractionated hardwood alkali lignin to the fractionated softwood alkali lignin; and
   d) extruding the lignin material.

2. Method of producing a structural carbon fiber, wherein a lignin fiber according to claim 1 undergoes the following subsequent process steps:
   e) stabilizing the lignin fiber;
   f) carbonizing the stabilized lignin fiber.

3. Method according to claim 1, wherein the fractionated and isolated hardwood alkali lignin in a) amounts to 1.5-100% by weight of the total weight.

4. Method according to claim 3, wherein the fractionated and isolated hardwood alkali lignin amounts to 3-100% by weight of the total weight.

5. Method according to claim 4, wherein the fractionated and isolated hardwood alkali lignin amounts to 5-95% by weight of the total weight.

6. Method according to claim 5, wherein the fractionated and isolated hardwood alkali lignin amounts to 25-75% by weight of the total weight.

7. Method according to claim 1, wherein the fractionated and isolated softwood alkali lignin in a) amounts to 50-100% by weight of the total weight.

8. Method according to claim 7, wherein the fractionated and isolated softwood alkali lignin amounts to 60-90% by weight of the total weight.

9. Method according to claim 8, wherein the fractionated and isolated softwood alkali lignin amounts to 75-85% by weight of the total weight.

10. Method according to claim 1, wherein the extrusion in d) is melt extrusion and is performed at a temperature exceeding the glass transition temperature of the lignin material by 20-85° C.

11. Method according to claim 10, wherein said temperature interval is melt extrusion is performed at a temperature exceeding the glass transition temperature of the lignin material by 25-50° C.

12. Method, according to claim 1, wherein the extruding extrusion in d) is by melt extrusion and is performed at a temperature in the range of 110-250° C.

13. Method according to claim 2, wherein in e) the lignin fiber is stabilized by air or oxygen.

14. Method of producing a continuous lignin fiber according to claim 1, wherein the lignin fiber is subsequently stabilized.

15. Method of producing a structural carbon fiber according to claim 14, wherein the stabilized lignin fiber is carbonized.

* * * * *

UNITED STATES PATENT AND TRADEMARK OFFICE
CERTIFICATE OF CORRECTION

PATENT NO. : 9,446,955 B2
APPLICATION NO. : 13/985255
DATED : September 20, 2016
INVENTOR(S) : Elisabeth Sjöholm et al.

It is certified that error appears in the above-identified patent and that said Letters Patent is hereby corrected as shown below:

On the Title Page

Item (75), Inventors at Line 1, Change "Sjholm," to --Sjöholm--.

In the Drawings

Sheet 1 of 1 at Line 1, Insert --Figure 1-- before the figure.

In the Claims

In Column 10 at Lines 32-33 (approx.), In Claim 11, after "said" delete "temperature interval is".

In Column 10 at Line 36 (approx.), In Claim 12, change "Method," to --Method--.

In Column 10 at Line 37 (approx.), In Claim 12, before "in" delete "extrusion".

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*